United States Patent [19]

Ogorek

[11] Patent Number: 5,177,874
[45] Date of Patent: Jan. 12, 1993

[54] GAGE FOR HEX HEAD FASTENERS

[76] Inventor: Robert A. Ogorek, 5332 Sycamore North, Burton, Mich. 48509

[21] Appl. No.: 769,248

[22] Filed: Oct. 1, 1991

[51] Int. Cl.[5] .............................................. G01B 5/02
[52] U.S. Cl. ........................................ 33/794; 33/801; 33/830
[58] Field of Search ................ 33/792, 794, 797, 803, 33/679.1, 783, 798, 801, 799, 813, 830

[56] References Cited

U.S. PATENT DOCUMENTS

| | | |
|---|---|---|
| 382,503 | 5/1888 | Anderson ................................ 33/792 |
| 1,066,007 | 7/1913 | Goodkowitz ........................... 33/799 |
| 1,382,628 | 6/1921 | Daniels ................................... 33/799 |
| 1,432,324 | 10/1922 | Fannen . |
| 1,617,669 | 2/1927 | Coyle ...................................... 33/830 |
| 1,650,653 | 11/1927 | Reiman ................................... 33/794 |
| 1,694,558 | 9/1926 | O'Flaherty . |
| 1,801,456 | 4/1931 | Pryor . |
| 2,416,228 | 2/1947 | Sheppard . |
| 2,468,581 | 4/1949 | Wells ....................................... 33/794 |
| 2,651,112 | 9/1953 | Duclos .................................... 33/797 |
| 3,117,380 | 1/1964 | Jacobs ..................................... 33/799 |
| 3,161,092 | 12/1964 | Davis . |
| 3,177,588 | 4/1965 | Sorensen ................................. 33/783 |
| 3,193,935 | 7/1965 | Jouanny ................................ 33/679.1 |
| 3,244,428 | 4/1966 | Röhm . |
| 3,374,547 | 3/1968 | Abbott .................................... 33/794 |
| 3,719,110 | 3/1973 | LaPointe . |
| 3,724,299 | 4/1973 | Nelson . |
| 3,818,598 | 6/1974 | Hershire ................................. 33/794 |
| 3,822,476 | 7/1974 | Leveridge ............................ 33/679.1 |
| 3,893,813 | 7/1975 | Johnson . |
| 4,022,086 | 5/1977 | Ramsey . |
| 4,300,415 | 11/1981 | Saila . |
| 4,346,734 | 8/1982 | Frank . |
| 4,520,698 | 6/1985 | Martinmaas . |
| 4,805,888 | 2/1989 | Bishop . |
| 4,947,558 | 8/1990 | Cummins ................................ 33/797 |

FOREIGN PATENT DOCUMENTS 366745  1/1923  Fed. Rep. of Germany ........ 33/813

Primary Examiner—Thomas B. Will
Attorney, Agent, or Firm—Gifford, Groh, Sprinkle, Patmore and Anderson

[57] ABSTRACT

A gage for measuring and displaying the dimensional distance across the flats of a hex head of a hex head fastener having a rotatable handle attached through a shaft to a gear. The gear engages racks of a movable jaw having faces which engage the flats of the hex head. The distance between the faces of the movable jaws when engaging a hex head is displayed through a window provided through the rotatable handle. The display contains interspersed metric and English units.

6 Claims, 1 Drawing Sheet

GAGE FOR HEX HEAD FASTENERS

BACKGROUND OF THE INVENTION

I. Field of the Invention

The present invention relates to gaging. More particularly, the present invention relates to gaging the hexagonally shaped heads of fasteners.

II. Description of the Prior Art

Manufacturers have long sought suitable gaging devices to quickly determine the size of a fastener. Fasteners conform to standard dimensional specifications which can be readily ascertained by reference to tables of bolt and nut data in engineering source books. By using the information provided in the reference tables, if the width across flats of a hex head fastener can be determined, then other dimensional data can be assumed.

Since the early days of manufacturing and assembly, a steel rule has been used for placing across the head of the item for which more dimensional information is sought. In lieu of the extremely simple steel rule, Calipers or any other of a number of measuring devices can be used. However, these are all awkward to use. Clearly, these type of devices are valuable only in a limited number of circumstances, such as when measuring a single item.

In an effort to overcome the problems of known hex head fastener gaging, several modifications have been attempted.

A metric gage is described in U.S. Pat. No. 4,138,820 to O'Connor. This gage uses measuring sockets to gage sizes of components of nuts and bolts. This metric gage also has circular portions to gage the diameter of bolts and cylindrical means to gage nut size. The cylindrical means extends from the circular means.

A problem can arise in assembly operations when various types of fasteners are used in close proximity to one another. The problem is particularly acute when metric series sized fasteners become mixed with English, also known as United States, or inch sized fasteners. To the naked eye, some sizes of English/United States or inch designated fasteners are dimensionally close to metric series sized fasteners. If a metric series fastener that is dimensionally close to a English or United States series sized fastener should be substituted, the proper bolt holding torque cannot be applied to the bolt to hold it to the mating threads, thereby creating a potential safety, warranty or liability problem.

In the past, when a mixed load of fasteners has been found, it has been a tedious job to sort through the bolts and separate them for size as well as English or United States inch or metric series.

While providing some degree of ease in measuring hex head fasteners, all the known art suffers from a common defect, the lack of a quick method for measuring mixed loads of fastener hex heads comprising sizes in metric system series which are given in millimeters or English/United States system sizes of measurement which are given in units.

SUMMARY OF THE PRESENT INVENTION

The present invention overcomes those problems commonly associated with hex head fastener gages by providing a practical gage that provides varied measurements and is quick and easy to use for a variety of sizes, types of fasteners, and differing series of fasteners.

The hex head fastener gage of the present invention is designed for measuring the distance across the flats of hex head fasteners and is especially suitable for hand held use where the sorting of hex head bolts or screws is desired. The gage includes a rotatable handle and a jaw holder box portion attached to the rotatable handle. Jaws having jaw faces are provided inside the jaw holder box portion and are connected by a rack to a gear which is operatively connected by a shaft to the rotatable handle. The shaft is connected to a drum that has a display calibrated to the distance between the jaw faces, which is a measurement of the size of the hex across the flat surfaces. The nut or bolt, for which it is desired to know the nominal dimension across the flats, is held in the jaw holder box portion and the handle is rotated until the jaw faces encounter and tighten on the hex portion. Then the user of the hex head fastener gage views a display through the window for a measurement of the fastener held in the jaws. For quick release, the handle is rotated in an opposite direction, and the fastener then can be quickly removed.

The display in the window shows intermixed units of both metric and English or United States/inch fastener sizes, therefore a quick sorting of a variety of mixed series fasteners, etc. can be achieved.

Other advantages and features of the present invention will become more apparent from the following detailed description when read in conjunction with the accompanying drawing.

BRIEF DESCRIPTION OF THE DRAWING

The present invention will be more fully understood by reference to the following detailed description of the preferred embodiments of the present invention when read in conjunction with the accompanying drawing, in which like reference characters refer to like parts throughout the views, and in which.

DETAILED DESCRIPTION OF THE PREFERRED EMBODIMENT OF THE PRESENT INVENTION

The drawings disclose the preferred embodiments of the present invention. While the configurations according to the illustrated embodiments are preferred, it is envisioned that alternate configurations of the present invention may be adopted without deviating from the invention as portrayed. The preferred embodiments are discussed hereafter.

Figure 1:
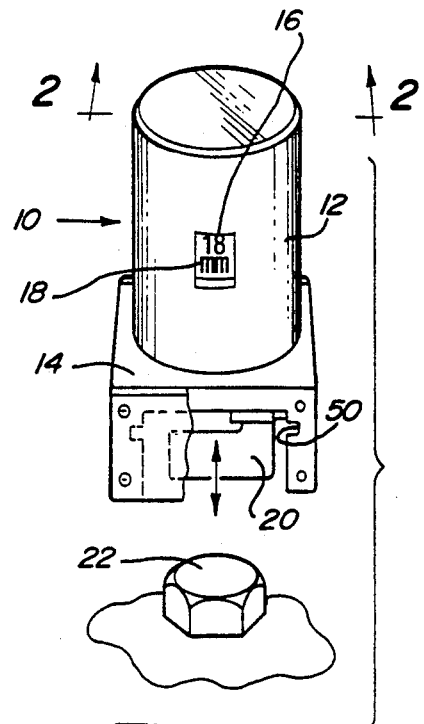
FIG. 1 is a perspective view illustrating a gage for a hex head fastener, according to the present invention.

FIG. 1 is a perspective view of the gage for hex head fasteners. The gage, generally indicated as 10, comprises a rotatable handle 12 and a box portion 14. The rotatable handle 12 has a window 16 therein. Through the window 16, an interior display 18 is visible. The display 18 indicates the distance between the gaging jaws 20 contained in the jaw holder box portion 14 defining a rectangular cavity, as will be explained. An example of a hex head, 22, that is measured by the gaging jaws 20 is included in FIG. 1.

Figure 2:
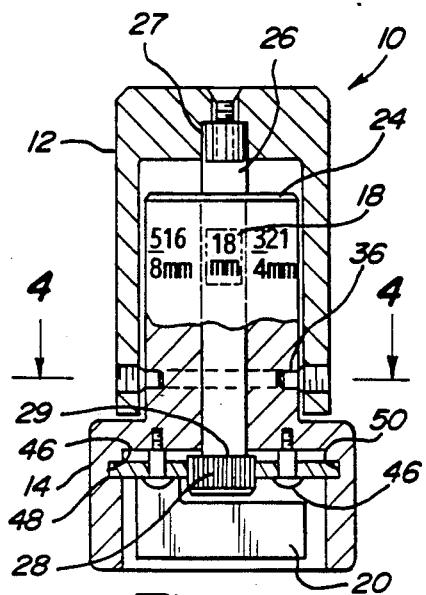
FIG. 2 is a sectional side view taken along Line 2—2 of FIG. 1.

A sectional side view of the gage 10 is shown in FIG. 2. The display 18 is contained on the external surface of a drum 24. The rotatable handle 12 is connected to a gear 28 by means of a shaft 26. The shaft 26 is fixed at its upper end 27 to handle 12 and freely extends through an axial bore provided in the drum 24. The gear 28 fixed to the other end 29 of shaft 26 and meshes with mating racks 30 provided on the gaging jaws 20.

Figure 3:
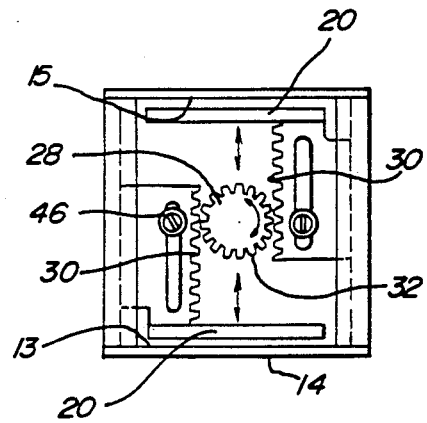
FIG. 3 is a bottom view of the gage.

FIG. 3 shows the meshing of the the teeth 32 of the gear 28 with complementary teeth of jaw racks 30 of the gaging jaws 20. As the gear 28 is turned by the rotatable handle 12 through the shaft 26, the intermeshing of the gear teeth 32 with the teeth of the jaw racks 30 causes the jaws 20 to move in opposing directions, changing the distance between the jaws 20. The jaws 20 can move apart or open until they abut the insides 13, 15 of the box portion 14, as shown in FIG. 3. The distance "X" between the jaws 20, shown in FIG. 5, is calibrated to be equal to the distance indicated on the display 18 viewable through the window 16.

Figure 4:
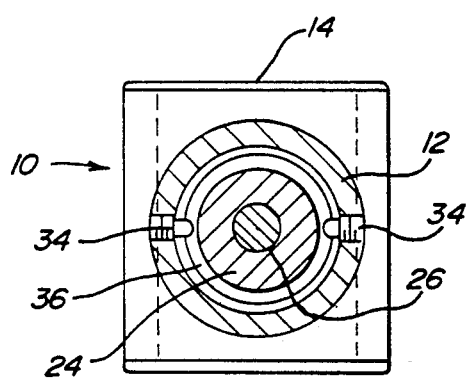
FIG. 4 is a sectional view along Line 4—4 of FIG. 2.

FIG. 4 is a cross-section showing lock pins 34 which hold the rotatable handle 12 on the drum 24. The lock pins 34 are slidably received in an annular groove 36 provided in the external surface of the drum 24 which allows rotation of the rotatable handle 12.

Figure 5:
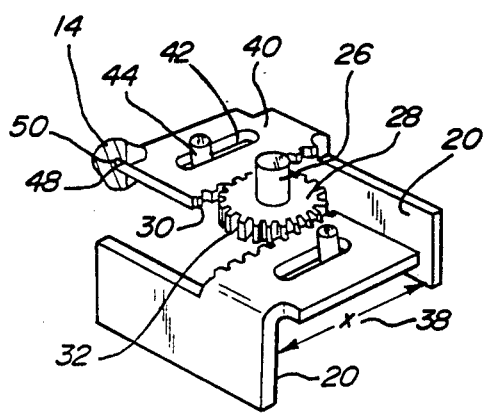
FIG. 5 is a perspective view of the jaw mechanism of the gage.

The racks 30 of the gaging jaws 20 are shown meshed with the gear teeth 32 of the gear 28 in FIG. 5. By rotating the gear 28, the gear teeth 32 operate against the racks 30 provided on a horizontal surface 40 of the gaging jaw 20.

The horizontal surface 40 has an elongated guide slot 42 through which a guide pin 44 with a head 46 (shown in FIGS. 2 and 3) slidably holds the gaging jaw 20 within the rectangular cavity of the jaw holder box portion 14.

The horizontal surface 40 of the gaging jaw 20 has an edge 48 that is slidingly held in a groove 50 provided in the side of the jaw holder box portion 14.

Having described my invention, it is envisioned that modifications may be made which nevertheless fall within the scope of the invention as claimed.

I claim:

1. A hex head gage for measuring the dimension across the flats of a hex head of a fastener comprising:
   a jaw holder having a drum portion provided at one end and a box portion provided at the other end, said drum portion having an axial bore provided therethrough and said box portion defining a rectangular cavity open at the end opposite said drum portion;
   a cylindrical handle circumscribing said drum portion and rotatably connected thereto, said cylindrical handle having a window permitting the viewing of a predetermined area of the drum portion;
   a gear provided in said rectangular cavity;
   a shaft rotatably disposed through said axial bore, said shaft having one end attached to said cylindrical handle and an opposite end attached to said gear;
   a pair of jaws slidably attached to said jaw holder inside of said rectangular cavity on opposite sides of said gear each jaw of said pair of jaws having a rack engaging said gear such that a rotation of said gear displaces said pair of jaws in opposite directions normal to the axis of said drum portion; and
   a measurement display provided on said drum portion aligned with said window, said measurement display calibrated to display in said window the dimension between the flats of a hexagonal head when said flats are engaged by said pair of jaws.

2. The gage as claimed in claim 1, wherein said measurement display displays the dimension between flats in at least two measurement systems.

3. The gage as claimed in claim 2, wherein one of said measurement systems is the metric system.

4. The gage as claimed in claim 2, wherein one of said measurement systems is the English system of inches.

5. The gage as claimed in claim 1, wherein said drum portion has an annular groove; and
   said cylindrical handle has locking means engaging said annular groove thereby allowing relative rotation between said cylindrical handle and said drum portion.

6. A gage for hex head fasteners for determining and displaying the dimension across flats of a hex head comprising:
   a rotatable handle having an outside and an inside and having a window from said outside to said inside;
   a gear;
   a shaft having ends, one of said ends being fixed to said rotatable handle and another of said ends being attached to said gear;
   a pair of jaws, each having a rack member engaging said gear;
   said pair of jaws each having a face movable toward and away from each other by rotation of said handle through said gear;
   a jaw holder slidably containing said pair of jaws and having a pair of opposite sides, and a bottom, said jaws engaging said pair of opposite sides in their fully opened position, and said bottom of said jaw holder being open to receive said hex head for measurement between said jaw faces; and
   a measurement display, calibrated to display in said window the dimension across the flats of said hex head when said jaw faces are brought into contact with said hex head by rotation of said handle.

* * * * *